UNITED STATES PATENT OFFICE.

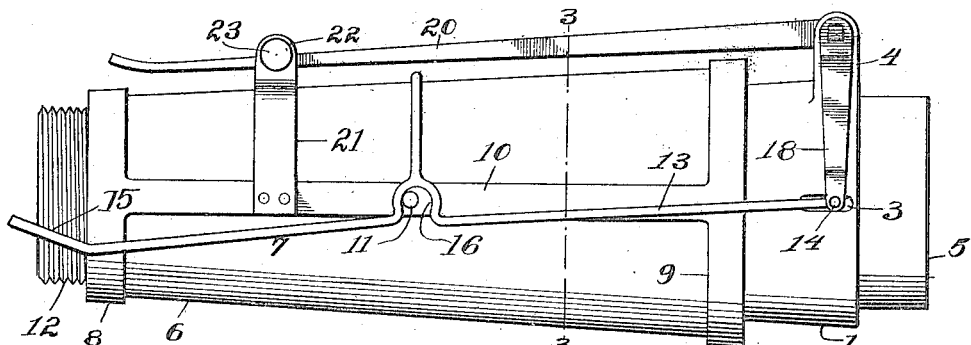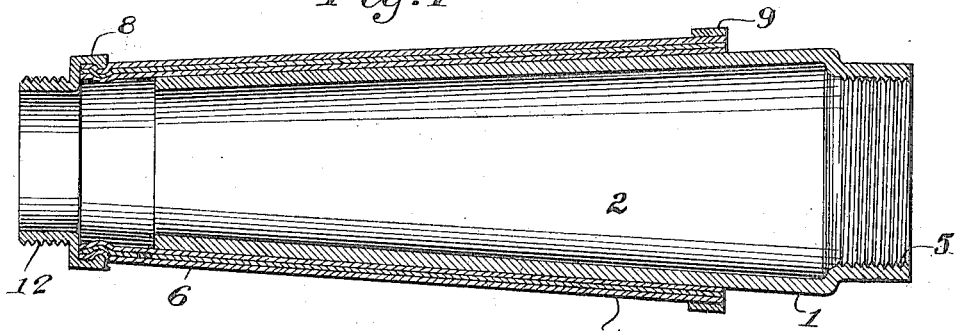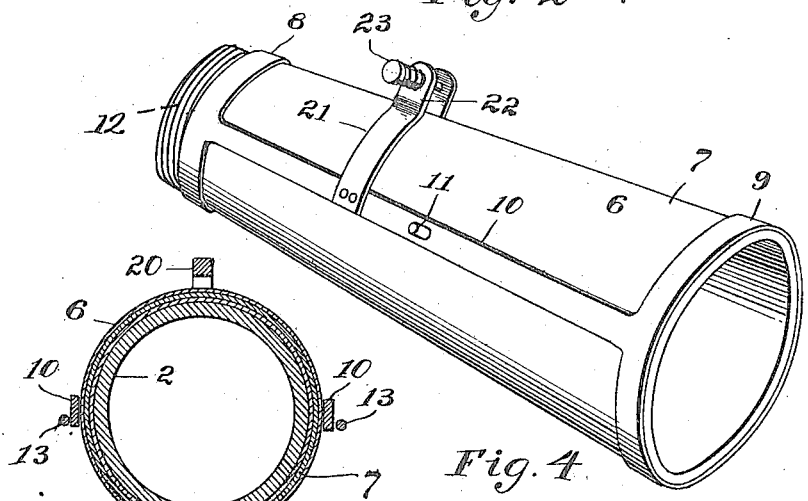

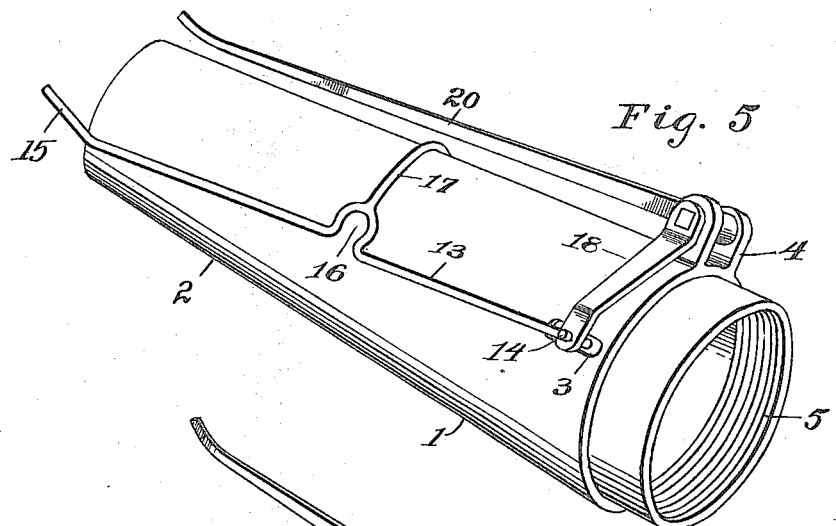
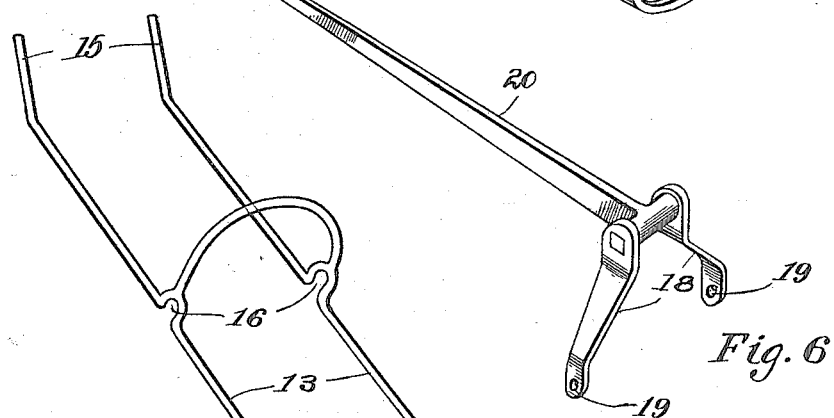
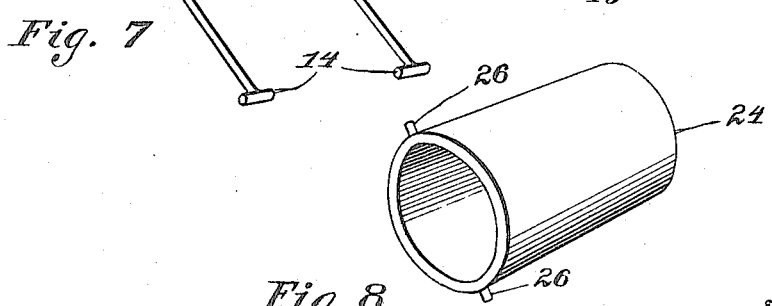

WALTER WAIDLICH, OF DETROIT, MICHIGAN.

HOSE-COUPLING.

1,208,417.   Specification of Letters Patent.   Patented Dec. 12, 1916.

Application filed September 25, 1915. Serial No. 52,649.

*To all whom it may concern:*

Be it known that I, WALTER WAIDLICH, a citizen of the United States, residing at Detroit, in the county of Wayne and State of Michigan, have invented new and useful Improvements in Hose-Couplings, of which the following is a specification.

This invention relates to certain novel and useful improvements in hose couplings.

In carrying out the present invention, it is my purpose to provide a hose coupling which will be found especially useful for connecting the end of a hose with a hydrant or similar source of supply and whereby the hose may be quickly attached to the hydrant and detached therefrom.

It is also my purpose to provide a coupling of the class described wherein the companion members, when assembled in coupling formation, will be securely locked together so that accidental disconnection of such members will be avoided.

With the above and other objects in view, the invention consists in the construction, combination and arrangement of parts hereinafter set forth in and falling within the scope of the claims.

In the accompanying drawings, Figure 1 is a view in side elevation of a hose coupling constructed in accordance with the present invention. Fig. 2 is a longitudinal sectional view therethrough. Fig. 3 is a cross sectional view through the same. Fig. 4 is a perspective view of the female member of the coupling. Fig. 5 is a similar view of the male member thereof. Fig. 6 is a like view of a detail of the invention. Fig. 7 is a perspective view of another detail. Fig. 8 is a perspective view of a cap for closing the male member of the coupling when the female member is removed therefrom.

Referring now to the drawing in detail, 1 designates the male member of the coupling, such member comprising a tubular sleeve 2 tapering from one end toward the other and having the relatively large end thereof formed at diametrically opposite points with longitudinally extending slots 3 and lugs 4 at a point between the slots 3. Formed on the last-mentioned end of the sleeve 2 coaxial therewith and projecting outwardly therefrom is an interiorly threaded nipple 5 adapted to engage the nipple on the hydrant.

6 designates the female member of the coupling adapted to fit over the male member and comprising a tubular sleeve 7 tapering from one end toward the other and having the small end thereof equipped with an annular band 8 and the relatively large end equipped with an annular band 9. Disposed at diametrically opposite sides of the sleeve 7 are strips 10 having the opposite ends thereof secured to the annular bands 8 and 9 respectively and formed on each strip 10 and projecting outwardly therefrom adjacent to the relatively small end of the sleeve 7 is a lug 11, while formed on the relatively small end of the sleeve and extending outwardly therefrom coaxial therewith is an exteriorly threaded nipple 12 adapted to engage the interiorly threaded nipple on the hose.

The male member 1 of the coupling is preferably formed of brass or other metal, while the female member 6 is composed of rubber or analogous substance and in the use of the coupling the nipple 5 threadedly engages the nipple on the hydrant, while the nipple 12 is threaded onto the nipple on the hose. The female member of the coupling is now passed over the male member thereof and owing to the resiliency of the material of the female member and the rigidity of the material of the male member the sleeve 7 snugly engages the outer wall of the sleeve 2 thus forming a fluid tight joint between the parts, the relatively small end of the sleeve 2 being disposed within the similar end of the sleeve 7, while the relatively large end of the last-mentioned sleeve encircles the sleeve 2 adjacent to the large end thereof.

In order to lock the female member on the male member and prevent accidental disconnection of such members, I employ a locking mechanism comprising rods 13 disposed at diametrically opposite sides of the coupling and each having one end thereof formed with a right angularly projecting pin 14 and the opposite end curved upwardly as at 15. The inner extremities of the pins 14 are disposed within the slots 3, while the remaining ends of such pins project beyond the rods 13. The rods 13 intermediate their lengths are formed to provide upwardly extending loops 16, 16, while connected to the central portions of the loops 16 are the extremities of a bail 17 surrounding the coupling and designed to rest upon the upper portion of the male member of the coupling, when the male and female members are disconnected, to limit the downward swinging movement of the rods 13 and so hold the same in proper positions at diametrically opposite sides of the male member of the coupling. In the movement of the female member onto the male member of the coupling, the pins 11 engage the upwardly extending end portions 15 of the rods 13 and so elevate the bail 17 out of engagement with the male member of the coupling and out of the path of movement of the relatively large end of the female member of the coupling so that the latter will readily slide onto the male member. As the female member reaches the limit of its movement onto the male member the loops 16 drop over the lugs 11 thereby holding the female member against accidental sliding movement along the male member. Mounted on the lugs 4 is a U-shaped yoke 18 embracing the relatively large end of the male member 1 and having the free ends thereof formed with eyes 19 receiving the outer ends of the pins 14 on the rods 13 and connected to the yoke 18 is a lever 20 extending toward the relatively small end of the sleeve 2 of the male member. Encircling the sleeve 7 of the female member of the coupling adjacent to the small end thereof is a strap 21 having the ends thereof secured, respectively, to the strips 10 and the central portion formed with upwardly projecting lugs 22 suitably spaced apart and formed with alining openings designed to receive a spring held pin 23. When the loops 16 drop into engagement with the lugs 11, in the movement of the female member onto the male member, the lever 20 is pressed downwardly whereby the pins 14 on the ends of the rods 13 are moved farther along the slots 3, thereby effectively clamping the female member on the male member.

In the downward movement of the lever 20, the outer end thereof rides between the lugs 22 and the pin 23 is withdrawn so that the lever 20 may be pressed against the outer surface of the sleeve 7, at which time the pin is released and springs into the path of the lever 20 to hold the latter against upward movement.

When the female member is disconnected from the male member, a cap 24 of a shape corresponding to that of the male member is slid onto the latter to prevent the entrance of dirt and dust into the sleeve 2, the cap 24 being formed at diametrically opposite points with outwardly extending lugs 25 adapted to receive the loops 16 of the rods 13 so that the cap will be held to the sleeve.

From the foregoing description taken in connection with the accompanying drawing, the construction, mode of operation and manner of employing my improved hose coupling will be readily apparent. It will be seen that I have provided a coupling wherein the companion members may be locked together securely and easily and wherein the use of screw threads between the members of the coupling is eliminated.

I claim:

1. In a coupling of the class described, a male member comprising a tubular sleeve tapering from one end to the other and formed at diametrically opposite points at the relatively large end thereof with longitudinally extending slots, and a lug between said slots, a female member comprising a sleeve tapering from one end to the other and designed to slide onto the first sleeve, lugs extending outwardly from said female member at diametrically opposite points intermediate the ends thereof, rods disposed at diametrically opposite parts of the coupling, a pin on one end of each rod having one extremity thereof disposed within the adjacent slot in said first sleeve, and the opposite extremity projecting beyond the rod, said rods having the central portions thereof formed with loops adapted to receive said lugs in the movement of the last-mentioned sleeve whereby said sleeves will be locked against accidental disconnection.

2. In a coupling of the class described, a male member comprising a tubular sleeve tapering from one end to the other and formed at diametrically opposite points at the relatively large end thereof with longitudinally extending slots, and a lug between said slots, a female member comprising a sleeve tapering from one end to the other and designed to slide onto the first sleeve, lugs extending outwardly from said female member at diametrically opposite points intermediate the ends thereof, rods disposed at diametrically opposite parts of the coupling, a pin on one end of each rod having one extremity thereof disposed within the adjacent slot in said first sleeve, and the opposite extremity projecting beyond the rod, said rods having the central portions thereof formed with loops adapted to receive said lugs on the movement of the last-mentioned sleeve whereby said sleeves will be locked against accidental disconnection, and a bail having the extremities thereof secured to the looped portions of said rods and adapted to bear upon the upper portion of said first sleeve when the sleeves are uncoupled to hold the rods in normal position.

3. In a coupling of the class described, a male member comprising a tubular sleeve tapering from one end to the other and formed at diametrically opposite points at the relatively large end thereof with longitudinally extending slots, and a lug between said slots, a female member comprising a sleeve tapering from one end to the other and designed to slide onto the first sleeve, lugs extending outwardly from said female member at diametrically opposite points intermediate the ends thereof, rods disposed at diametrically opposite parts of the coupling, a pin on one end of each rod having one extremity thereof disposed within the adjacent slot in said first sleeve, and the opposite extremity projecting beyond the rod, said rods having the central portions thereof formed with loops adapted to receive said lugs in the movement of the last-mentioned sleeve whereby said sleeves will be locked against accidental disconnection, a U-shaped yoke passed through said first lug and embracing the relatively large end of said first sleeve and having the free ends thereof formed with eyes receiving the outer extremities of said pins, and a lever connected to said yoke for swinging the latter to slide the pins farther along in the slots whereby the contacting surfaces of said sleeves will be drawn into frictional engagement.

4. In a coupling of the class described, a male member comprising a tubular sleeve tapering from one end to the other and formed at diametrically opposite points at the relatively large end thereof with longitudinally extending slots, and a lug between said slots, a female member comprising a sleeve tapering from one end to the other and designed to slide onto the first sleeve, lugs extending outwardly from said female member at diametrically opposite points intermediate the ends thereof, rods disposed at diametrically opposite parts of the coupling, a pin on one end of each rod having one extremity thereof disposed within the adjacent slot in said first sleeve, and the opposite extremity projecting beyond the rod, said rods having the central portions thereof formed with loops adapted to receive said lugs in the movement of the last-mentioned sleeve whereby said sleeves will be locked against accidental disconnection, a U-shaped yoke passed through said first lug and embracing the relatively large end of said first sleeve and having the free ends thereof formed with eyes receiving the outer extremities of said pins, a lever connected to said yoke for swinging the latter to slide the pins farther along in the slots whereby the contacting surfaces of said sleeves will be drawn into frictional engagement, and a spring actuated pin carried by said last-mentioned sleeve to engage said lever and hold the latter against return to normal position succeeding the swinging of said yoke.

5. In a coupling of the class described, a male member comprising a tubular sleeve tapering from one end to the other and formed at diametrically opposite points at the relatively large end thereof with longitudinally extending slots, and a lug between said slots, a female member comprising a sleeve tapering from one end to the other and designed to slide onto the first sleeve, lugs extending outwardly from said female member at diametrically opposite points intermediate the ends thereof, rods disposed at diametrically opposite parts of the coupling, a pin on one end of each rod having one extremity thereof disposed within the adjacent slot in said first sleeve, and the opposite extremity projecting beyond the rod, said rods having the central portions thereof formed with loops adapted to receive said lugs in the movement of the last-mentioned sleeve whereby said sleeves will be locked against accidental disconnection, and a cap corresponding in shape to that of the male member of the coupling and adapted to inclose the latter when the members of the coupling are disconnected whereby the entrance of dirt into the male member of the coupling is eliminated.

In testimony whereof I affix my signature in presence of two witnesses.

WALTER WAIDLICH.

Witnesses:
FRED W. DALBY,
GRACE BURTON.